United States Patent [19]
Swindler

[11] Patent Number: 5,751,524
[45] Date of Patent: May 12, 1998

[54] GROUND FAULT PROTECTION CIRCUIT FOR A MULTIPLE SOURCE SYSTEM

[75] Inventor: David L. Swindler, Murfreesboro, Tenn.

[73] Assignee: Square D Company, Palatine, Ill.

[21] Appl. No.: 814,302

[22] Filed: Mar. 10, 1997

[51] Int. Cl.$^6$ .................................................. H02H 3/00
[52] U.S. Cl. ............................. 361/42; 361/44; 361/63; 361/115
[58] Field of Search .................................. 361/42, 44, 45, 361/62, 63, 64, 66, 87, 115, 48

[56] References Cited

U.S. PATENT DOCUMENTS

| | | | |
|---|---|---|---|
| 3,259,802 | 7/1966 | Steen | 361/42 |
| 3,558,981 | 1/1971 | Zocholl | 361/42 |
| 3,949,272 | 4/1976 | Smith | 361/44 |
| 4,068,275 | 1/1978 | Teel | 361/44 |
| 4,110,808 | 8/1978 | Hobson, Jr. | 361/44 |

*Primary Examiner*—Jeffrey A. Gaffin
*Assistant Examiner*—Stephen W. Jackson
*Attorney, Agent, or Firm*—Larry I. Golden; Kareem M. Irfan; Wayne H. Stoppelmoor

[57] ABSTRACT

An improved ground fault protection system is provided for protecting an electrical power distribution system having multiple sources and multiple grounds. In accordance with a preferred embodiment, an electrical power distribution circuit having a primary electrical circuit for distributing electrical power from a plurality of sources to a plurality of loads is provided with a ground fault protection circuit magnetically coupled to the primary circuit. The primary electrical circuit includes conventional main and tie buses for distributing power to the loads and switches or circuit breakers for interrupting power from flowing in the buses. The ground fault protection circuit includes current sensors, tripping functions or ground fault relays associated with each circuit breaker and a novel use of an auxiliary transformer. When a ground fault occurs, the ground fault protection circuit is capable of sensing and determining the specific bus in which a ground fault condition exists. It then selectively sends a trip current generated by the associated current sensor only to the proper tripping functions for tipping the appropriate circuit breakers in the affected bus in order to isolate the ground fault; this avoids unnecessary tripping of circuit breakers in bus portions which are not affected by the ground fault. The auxiliary transformer uniquely sends the trip current to portions of the ground fault protection circuits that would not have been connected, or accessible, in the ground fault protection circuits of the prior art.

11 Claims, 5 Drawing Sheets

GROUND FAULT PROTECTION CIRCUIT FOR A MULTIPLE SOURCE SYSTEM

FIELD OF THE INVENTION

This invention relates generally to ground fault protection circuits for electrical distribution equipment, and more particularly, to a ground fault protection circuit for switchboards and switchgear having multiple sources and grounds.

BACKGROUND OF THE INVENTION

Ground fault protection ("GFP") circuits are commonly used for providing automatic circuit interruption upon detection of undesired short circuit currents which flow as a result of a ground fault condition in electrical power distribution systems. Such GFP circuits ordinarily include means for quickly sensing and individually isolating any faults occurring in a respective branch circuit of the power distribution systems and utilize selective coordination to instantly respond and interrupt power only to the system area where a fault occurs thereby preventing unnecessary loss of power to other areas. One example of such a GFP circuit is described in U.S. Pat. No. 3,259,802 entitled "Ground Fault Responsive Protective System for Electric Power Distribution Apparatus." Protective circuits of this type utilize zone protective interlocking to be capable of selectively clearing a fault in a specific system area without interrupting power to other sections of the system. In such GFP circuits, a restraining signal is transmitted from a downstream circuit breaker (remote from the source) to an upstream circuit breaker (closer to the source) instructing that circuit breaker not to trip, permitting the downstream circuit breaker to trip and isolate the fault. Thus, when a ground fault occurs on a feeder circuit, the main circuit breaker is prevented from interrupting while allowing a circuit breaker on the feeder circuit to interrupt. The main electric power bus will consequently remain in service while the faulted feeder circuit is interrupted and the fault is isolated.

GFP circuits of this type are quite effective in single source electrical distribution systems where only one circuit breaker is required to trip and clear the fault. However, as modem power distribution systems become increasingly complex and use multiple power sources and current paths, such systems require added circuit breakers for adequate circuit protection. More complex ground fault protection circuits are consequently required.

Other types of GFP circuits using secondary circuits have been designed to accommodate multiple sources; circuits of this type are disclosed in U.S. Pat. Nos. 3,949,272, 4,068, 275 and 4,110,808. Such circuits utilize a secondary circuit for routing control or tripping currents to actuate ground fault relays and cause designated circuit breakers to trip thereby interrupting power only to the portion of the primary circuit which has a ground fault. However, a disadvantage to these protective circuits is that time-current trip coordination or zone selective interlocking schemes are required to isolate a ground fault.

Another drawback with these protective circuits is that auxiliary control contacts must be used to control the circuit breakers. In particular, a disadvantage with the protective circuit shown in U.S. Pat. No. 4,110,808 is the difficulty in coordinating the specific circuit breaker to be tripped. This causes more circuit breakers to trip during a ground fault than is required, thereby causing more loads to lose power than is necessary. Additionally, circuits of this type do not allow all of the circuit breakers to be closed during normal operations. Circuits of the type shown in U.S. Pat. No. 4,068,275 have the disadvantage of being expensive because they require more equipment, such as current transformers, to isolate and interrupt the power in the section of the system where the ground fault occurs. A drawback of circuits of the type shown in U.S. Pat. No. 3,949,272 is the inability to utilize the advance capabilities of some of the modern day circuit breakers.

Accordingly, there is a distinct need to provide an improved ground fault protection circuit which overcomes the limitations of the prior art and is capable of effectively protecting electrical power distribution systems having multiple sources, loads and grounds while, at the same, providing sufficient zone selectivity to prevent needless loss of power.

SUMMARY OF THE INVENTION

The present invention provides an improved ground fault protection system for protecting an electrical distribution system having multiple sources and multiple grounds. In accordance with a preferred embodiment, an electrical power distribution circuit having a primary electrical circuit for distributing electrical power from a plurality of sources to a plurality of loads is provided with a ground fault protection circuit magnetically coupled to the primary circuit. The primary electrical circuit includes conventional main and tie buses for distributing power to the loads and switches or circuit breakers for interrupting power from flowing in the buses. The ground fault protection circuit includes current sensors, tripping functions or ground fault relays associated with each circuit breaker and a novel use of an auxiliary transformer. When a ground fault occurs, the ground fault protection circuit is capable of sensing and determining the specific bus in which a ground fault condition exists. It then selectively sends a trip current generated by the associated current sensor only to the proper tripping functions for tripping the appropriate circuit breakers in the affected bus in order to isolate the ground fault; this avoids unnecessary tripping of circuit breakers in bus portions which are not affected by the ground fault. The auxiliary transformer uniquely sends the trip current to portions of the ground fault protection circuits that would not have been connected, or accessible, in the ground fault protection circuits of the prior art. The use of the auxiliary transformer i) eliminates the need for auxiliary contacts, ii) allows all of the circuit breakers in the primary circuit to be originally closed and iii) eliminates the need for time-current trip coordination and zone selective interlocking schemes for preventing unnecessary tripping of circuit breakers in bus portions which are not affected by the ground fault.

BRIEF DESCRIPTION OF THE DRAWINGS

Other objects and advantages of the invention will be apparent from the following detailed description and the accompanying drawings in which.

Figure 1:
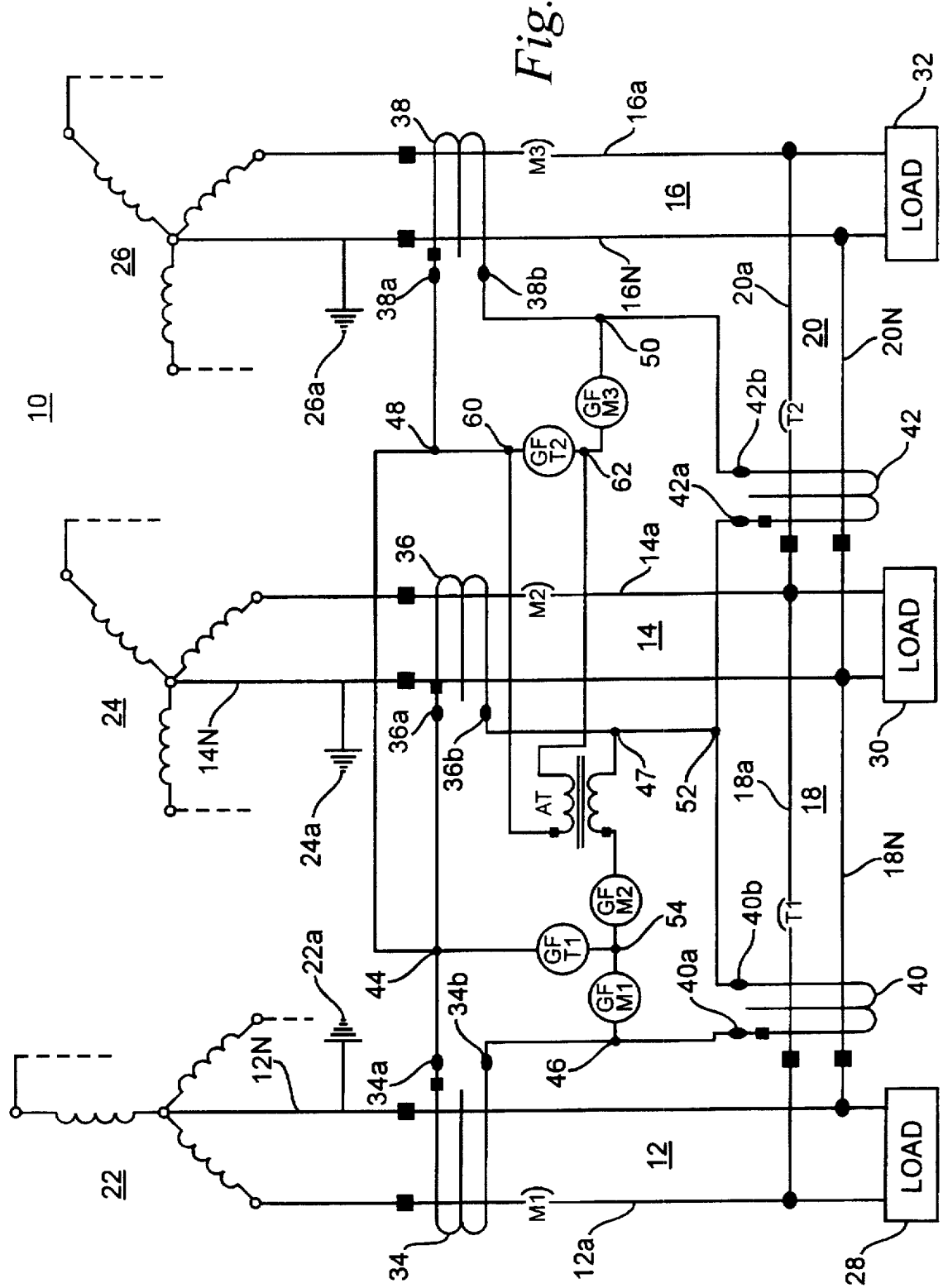
FIG. 1 is a schematic representation of a representative power distribution system having a ground fault protection circuit according to a preferred embodiment of the present invention.

While the invention is susceptible to various modifications and alternative forms, a specific embodiment thereof has been shown by way of example in the drawings and will be described in detail. It should be understood, however, that it is not intended to limit the invention to the particular form described, but on the contrary, the invention is to cover all modifications, equivalents, and alternatives falling within the spirit and scope of the invention as defined by the appended claims.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

FIG. 1 shows a one-line schematic diagram of a three-phase four-wire electrical power distribution system 10 in accordance with the preferred embodiment. The system 10 includes a primary circuit and a secondary or ground fault protection circuit in accordance with the preferred embodiment of the present invention for protecting the primary circuit against currents caused by ground fault conditions that may occur in the system 10. The primary circuit consists of three main buses 12, 14 and 16 and two tie buses 18 and 20 interconnecting the main buses. Power sources, such as three-phase grounded-neutral transformers 22, 24, 26, supply power to loads 28, 30, 32 which are respectively connected to the main buses 12, 14 and 16 through main switches or circuit breakers M1, M2 and M3, respectively, when the main circuit breakers are closed. Opening of the main circuit breaker M1 disconnects the source 22 from its associated bus 12, opening the main circuit breaker M2 disconnects the source 24 from its associated bus 14 and opening the main circuit breaker M3 disconnects the source 26 from its associated bus 16. The tie bus 18 contains a tie switch or circuit breaker T1 that, when closed, connects the main buses 12 and 14 together and, when open, opens the tie bus 18 to disconnect the main buses from each other. The tie bus 20 contains a tie switch or circuit breaker T2 that, when closed, connects the main buses 14 and 16 together and, when open, opens the tie bus 20 to disconnect the main buses from each other. The main buses 12, 14 and 16 and the tie buses 18 and 20 consists of three phase conductors respectively designated as 12a, 14a, 16a, 18a and 20a and a neutral conductor respectively designated as 12N, 14N, 16N, 18N, and 20N.

The sources 22, 24 and 26 are shown as each comprising a transformer secondary having three phase windings connected in wye configuration with their neutral points solidly grounded at 22a, 24a and 26a, respectively. The neutral point of source 22 is connected to the neutral conductor 12N, while the neutral point of source 24 is connected to the neutral conductor 14N and the neutral point of source 26 is connected to the neutral conductor 16N.

The ground fault protection circuit in accordance to the preferred embodiment of the present invention is magnetically coupled to the primary circuit and is provided to protect the system 10 from ground faults that may occur in the system. For example, if a ground fault occurs on the main bus 12, it is usually necessary to open the main circuit breaker M1 and the tie circuit breaker T1 to isolate the fault from the rest of the system. Under such circumstances, the remaining circuit breakers M2, M3, and T2 should remain in the position they were in prior to the occurrence of the ground fault to permit uninterrupted power from the sources 24 and 26 to continue over the sound buses 14, 16 and 20.

Similarly, if a ground fault should occur on the main bus 14, the main circuit breaker M2 and the tie circuit breakers T1 and T2 should be opened to isolate the fault from the remaining buses, while the main circuit breakers M1 and M3 should remain closed to maintain power from the sources 22 and 26, respectively, to the main buses 12 and 16, respectively.

The ground fault tripping function of the main circuit breakers M1, M2 and M3 and the tie circuit breakers T1 and T2 are controlled by trip functions or ground fault relays represented as GFM1, GFM2, GFM3, GFT1 and GFT2, respectively. Effective energization of these ground fault relays (i.e. energization by current flowing therethrough above a predetermined level) causes the associated circuit breaker to open, if it is closed. For example, if current in excess of a predetermined level flows through the ground fault relay GFM1, then main circuit breaker M1 will open.

In accordance with the principles of the present invention, effective energization of the ground fault relays GFM1, GFM2, GFM3, GFT1 and GFT2 is controlled by current flowing through the ground fault protection circuit. The ground fault protection circuit includes the ground fault relays, current sensors 34, 36, 38, 40 and 42 and an auxiliary transformer AT. The current sensors are responsive to the vector sum of the currents flowing through the primary conductors at the location of the individual sensor. The auxiliary transformer AT preferably has a transformation ratio of 1:1 or 5:5.

Each of the current sensors consist of four current transformers (not shown) for sensing the current flowing in its associated phase and neutral buses. These current transformers develop current signals representative of the currents flowing in the phase and neutral buses for separate application to the ground fault protection circuit. The four current transformers having primary windings coupled to the three phases and neutral and secondary windings connected in parallel, and the parallel combination has output terminals which are coupled in series with the ground fault protection circuit. The current sensors develop a current through their terminals that is substantially proportional to the vector sum of the currents flowing through the three primary conductors and the neutral conductor at the location of the current sensor. So long as this vector sum is zero, the current sensor develops no effective secondary current through its terminals, but this secondary current increases as this vector sum increases. Although the preferred embodiment is shown utilizing current sensors having four current transformers, it should be understood that current sensors utilizing any number of current transformers may be utilized so long as the same principles of current sensing is followed. That is, the current sensor produces no effective secondary current through its terminals when the vector sum is zero and produces a secondary current when the vector sum is not zero.

The polarities of the current sensors 34, 36, 38, 40 and 42 and the auxiliary transformer AT are indicated by the square black dots (polarity mark) adjacent the windings. More specifically, when primary current enters a given primary winding through the black dot adjacent this primary winding, secondary current leaves the associated secondary winding through the black dot adjacent the secondary winding. When the direction of the primary current is reversed, the direction of the secondary current is correspondingly reversed.

The current sensor 34 is located in the region of the main circuit breaker M1 and having four current transformers (not shown) having primary windings coupled to the main bus 12 adjacent to the main circuit breaker M1. These secondary windings are connected in parallel, and the parallel combination having terminals 34a and 34b coupled to nodes 44 and 46, respectively, in the ground fault protection circuit. The current sensor 34 develops a current through the terminals 34a and 34b that is substantially proportional to the vector sum of the currents through the main bus 12 at the location of the current sensor. So long as the vector sum is zero, current sensor 34 does not develop any effective secondary current through the terminals 34a and 34b; however, this secondary current increases as this vector sum increases.

For sensing the vector sum of the current through the main bus 14, the current sensor 36 is provided in the region of the main circuit breaker M2. The current sensor 36 comprises four current transformers (not shown) having primary windings coupled to the main bus 14 adjacent to the main circuit breaker M2. These secondary windings are connected in parallel, and the parallel combination having terminals 36a and 36b coupled to nodes 44 and 47, respectively, in the ground fault protection circuit. The current sensor 36 develops a current through the terminals 36a and 36b that is substantially proportional to the vector sum of the currents through the main bus 14 at the location of the current sensor. So long as the vector sum is zero, current sensor 36 does not develop any effective secondary current through the terminals 36a and 36b; however, this secondary current increases as this vector sum increases.

For sensing the vector sum of the current through the main bus 16, the current sensor 38 is provided in the region of the main circuit breaker M3. The current sensor 38 comprises four current transformers (not shown) having primary windings coupled to the main bus 16 adjacent to the main circuit breaker M3. These secondary windings are connected in parallel, and the parallel combination having terminals 38a and 38b coupled to nodes 48 and 50, respectively, in the ground fault protection circuit. The current sensor 38 develops a current through the terminals 38a and 38b that is substantially proportional to the vector sum of the currents through the main bus 16 at the location of the current sensor. So long as the vector sum is zero, current sensor 38 does not develop any effective secondary current through the terminals 38a and 38b; however, this secondary current increases as this vector sum increases.

For sensing the vector sum of the current through the tie bus 18, the current sensor 40 is provided in the region of the tie circuit breaker T1. The current sensor 40 comprises four current transformers (not shown) having primary windings coupled to the tie bus 18 adjacent to the tie circuit breaker T1. These secondary windings are connected in parallel, and the parallel combination having terminals 40a and 40b coupled to nodes 46 and 52, respectively, in the ground fault protection circuit. The current sensor 40 develops a current through the terminals 40a and 40b that is substantially proportional to the vector sum of the currents through the tie bus 18 at the location of the current sensor. So long as the vector sum is zero, current sensor 40 does not develop any effective secondary current through the terminals 40a and 40b; however, this secondary current increases as this vector sum increases.

For sensing the vector sum of the current through the tie bus 20, the current sensor 42 is provided in the region of the tie circuit breaker T2. The current sensor 42 comprises four current transformers (not shown) having primary windings coupled to the tie bus 20 adjacent to the tie circuit breaker T2. These secondary windings are connected in parallel, and the parallel combination having terminals 42a and 42b coupled to nodes 52 and 50, respectively, in the ground fault protection circuit. The current sensor 42 develops a current through the terminals 42a and 42b that is substantially proportional to the vector sum of the currents through the tie bus 20 at the location of the current sensor. So long as the vector sum is zero, current sensor 42 does not develop any effective secondary current through the terminals 42a and 42b; however, this secondary current increases as this vector sum increases.

The ground fault relay GFT1 has one side coupled to the terminal 34a of the current sensor 34 at the node 44 and its other side coupled between one side of the ground fault relays GFM1 and GFM2 at a node 54. The other side of the ground fault relay GFM1 is coupled to the terminal 34b of the current sensor 34 and the terminal 40a of the current sensor 40 at the node 46. The other side of the ground fault relay GFM2 is coupled to one end of the primary winding of the auxiliary transformer AT. The other end of the primary winding of the auxiliary transformer AT is coupled to the terminal 40b of the current sensor 40, the terminal 42a of the current sensor 42 and the nodes 47 and 52.

One end of the secondary winding of the auxiliary transformer AT is coupled to the terminal 34a of the current sensor 34, the terminal 38a of the current sensor 38, one end of the ground fault relay GFT2, a node 60 and the nodes 44 and 48. The other end of the secondary winding of the auxiliary transformer AT is coupled to the other end of the ground fault relay GFT2, one end of the ground fault relay GFM3 and a node 62. The other end of the ground fault relay GFM3 is coupled to terminal 38b of the ground fault sensor 38 and the terminal 42b of ground fault relay 42 at the node 50.

The operation of the ground fault protection circuit under various conditions will now be described. In analyzing where the currents will flow in the ground fault protection circuit, it must be remembered that (a) for a significant current to flow in a given transformer secondary winding, there must be a corresponding current flow in its primary winding and (b) Kirchoff's first law must be satisfied at each junction point or node (i.e., the algebraic sum of all instantaneous currents at each such node must equal zero).

Figure 2A:
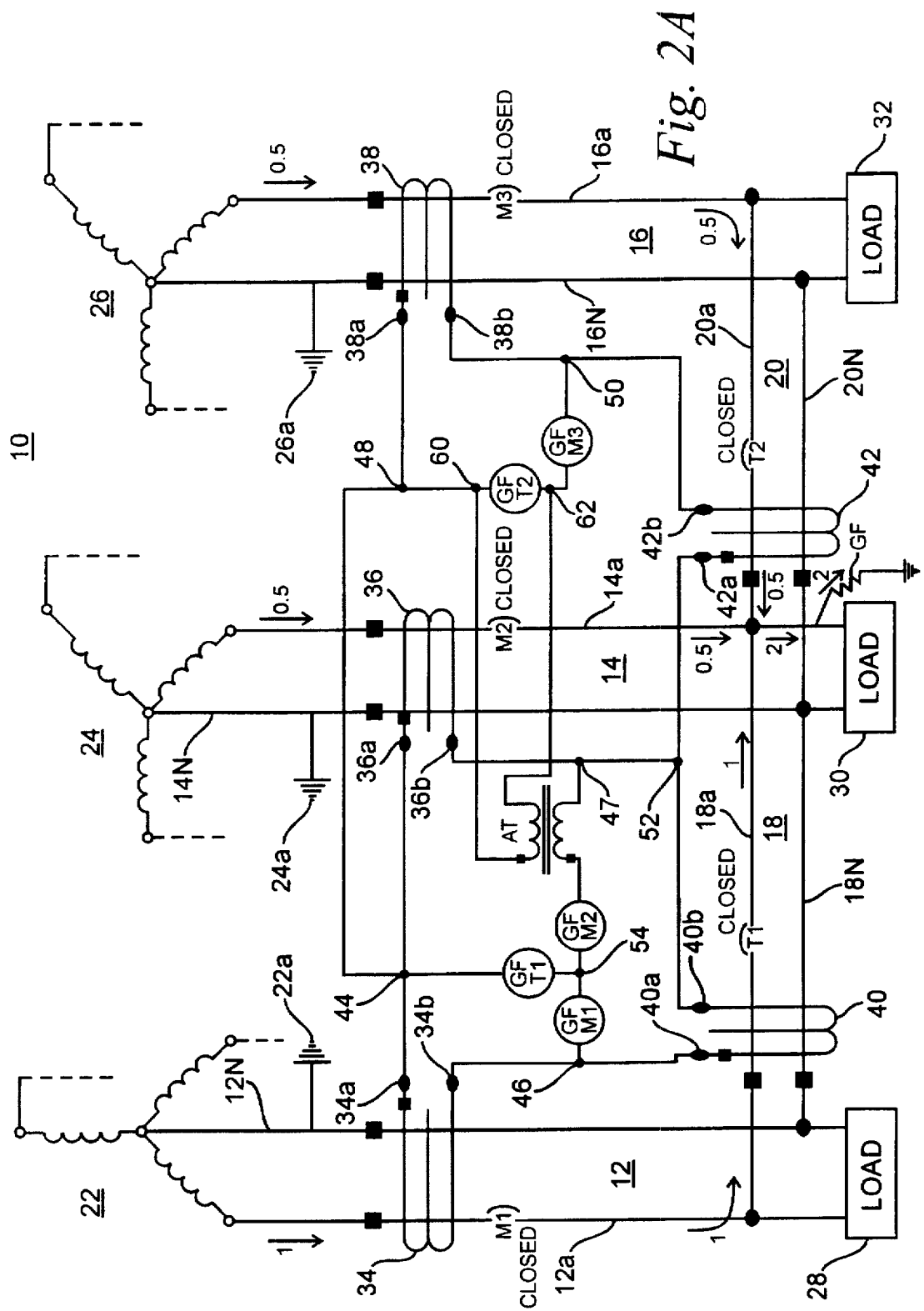
FIGS. 2A–2D are schematic representations of the power distribution system shown in FIG. 1, each representing an individual step in analyzing the circuit.

In analyzing the ground fault protection circuit, certain assumptions must be made. for example an assumption must be made as to what circuit breakers are closed or open and where the current is flowing over the main and tie buses. In the figures, the direction the current is flowing is represented by arrows and the magnitude is represented in a per unit basis and indicated adjacent to the arrows. FIG. 2A shows that we assume that all of the circuit breakers are closed and that 1 unit of current is flowing from the source 22 on the main bus phase conductors 12a, 0.5 unit of current is flowing from the source 24 on the main bus phase conductors 14a and 0.5 unit of current is flowing from the source 26 on the main bus phase conductors 16a. Additionally, we assume that a ground fault condition, designated as GF, is located on the main bus 14 and consists of 2 units of current. We have a total of 2 units of current going into the system 10 from the sources and 2 units of current leaving the system in the form of a ground fault. The summation of the currents flowing into and out of the system 10 is zero.

According to Kirchoff's first law, if current is flowing from the sources, then current must return to the sources and whatever current returns to the source must equal that which is going out. In electrical power distribution systems, there are many paths over which the current my flow as it is returning back to the source. For example, the current may flow in the sheet metal of the enclosure or the neutral conductor. In the system shown, it is important to consider those currents which may flow through the neutrals.

Figure 2B:
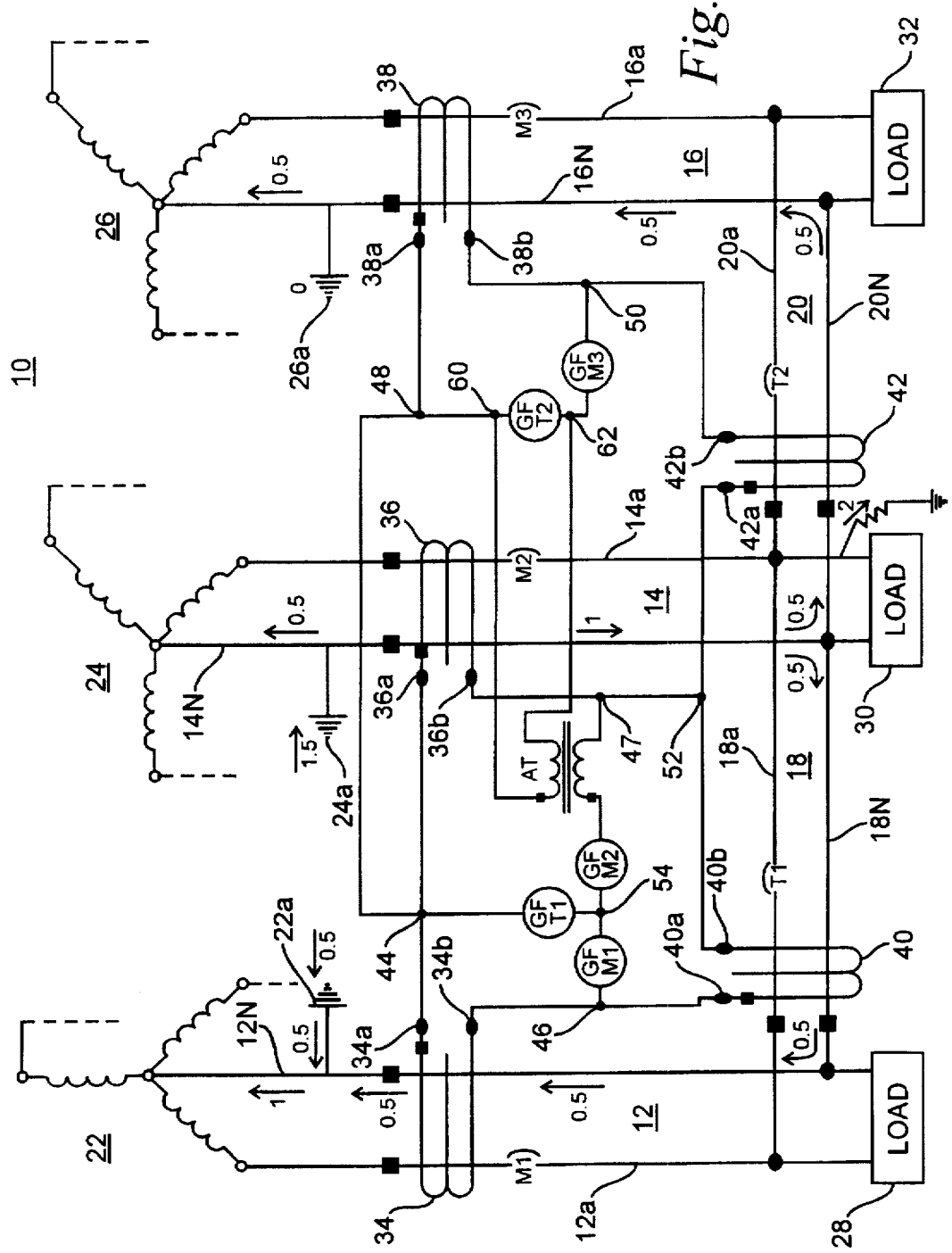

FIG. 2B shows the assumption we make in analyzing the system 10 of how the ground fault current may re-enter the system and return to the sources. Let us assume that 0.5 unit of current flows into the grounded neutral point 22a of the source 22, 1.5 units of current flow into the grounded neutral point 24a of the source 24 and zero units current flow into the grounded neutral point 26a of the source 26. Thus we have 2 units of current flowing back into the system 10, which balances the 2 units of current flowing out of the system through the ground fault GF. The current going into each source must equal the current going out. If the current entering a particular grounding point is not in balance with the current going into the source, then the excess or deficiency must come from the neutral conductor. Therefore, the currents must flow in the neutral conductors 12N, 14N, 16N, 18N and 20N as shown to balance all of the currents returning to the sources. For example, 1 unit of current must flow into the neutral conductor 14N and then split at a node 56 so that 0.5 unit of current flows in the neutral conductors 18N and 20N.

Figure 2C:
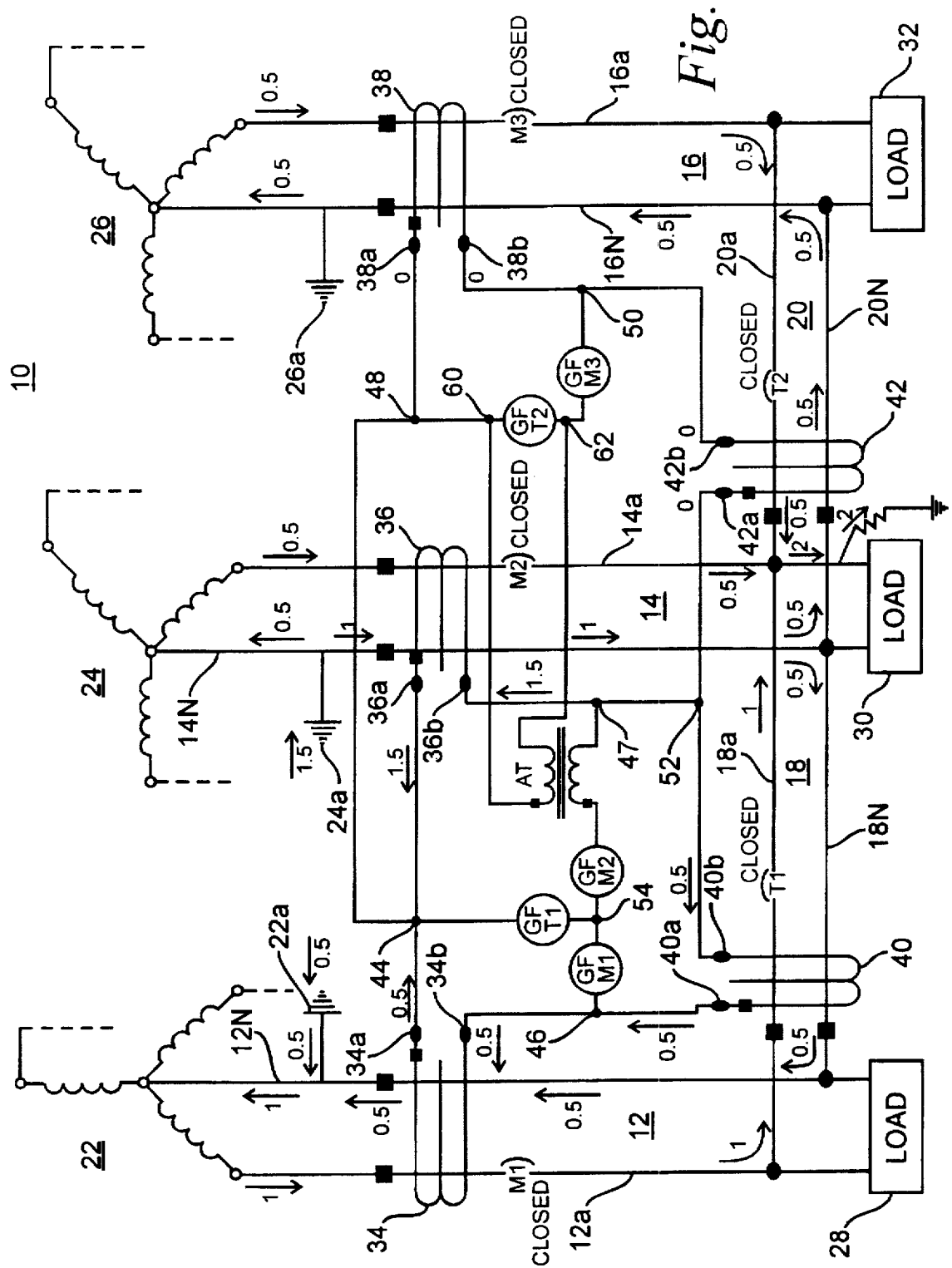

FIG. 2C shows the currents flowing through the main conductors 12a, 14a, 16a, 18a and 20a at each of the current sensors and indicates the currents leaving the current sensors. For example, 1 unit of current is flowing into the polarity mark of the current sensor 34 through the phase current conductors 12a and 0.5 unit of current is flowing away from the polarity mark of the current sensor 34 through the neutral conductor 12N. The sum of these two currents is 0.5 unit of current flowing into the polarity mark thereby causing 0.5 unit of current to flow from the secondary side of the current sensor 34 at the terminal 34a.

At the current sensor 36, 0.5 unit of current is flowing into the polarity mark through the phase conductors 14a and 1 unit of current is flowing into the polarity mark through neutral conductor 14N. Therefore, 1.5 units of current are flowing from the terminal 36a of the current sensor 36.

At the current sensor 38, 0.5 unit of current is flowing into the polarity mark through the phase conductors 16a and 0.5 unit of current is flowing away from the polarity mark through neutral conductor 16N. Therefore, no current is flowing from the secondary side of the current sensor 38.

At the current sensor 40, 1 unit of current is flowing into the polarity mark through the phase conductors 18a and 0.5 unit of current is flowing away from the polarity mark through neutral conductor 18N. Therefore, 0.5 unit of current is flowing from the secondary side of the current sensor 40 at terminal 40a.

At the current sensor 42, 0.5 unit of current is flowing from the polarity mark through the phase conductors 20a and 0.5 unit of current is flowing into the polarity mark through neutral conductor 20N. Therefore, no current is flowing from the secondary side of the current sensor 42.

Figure 2D:
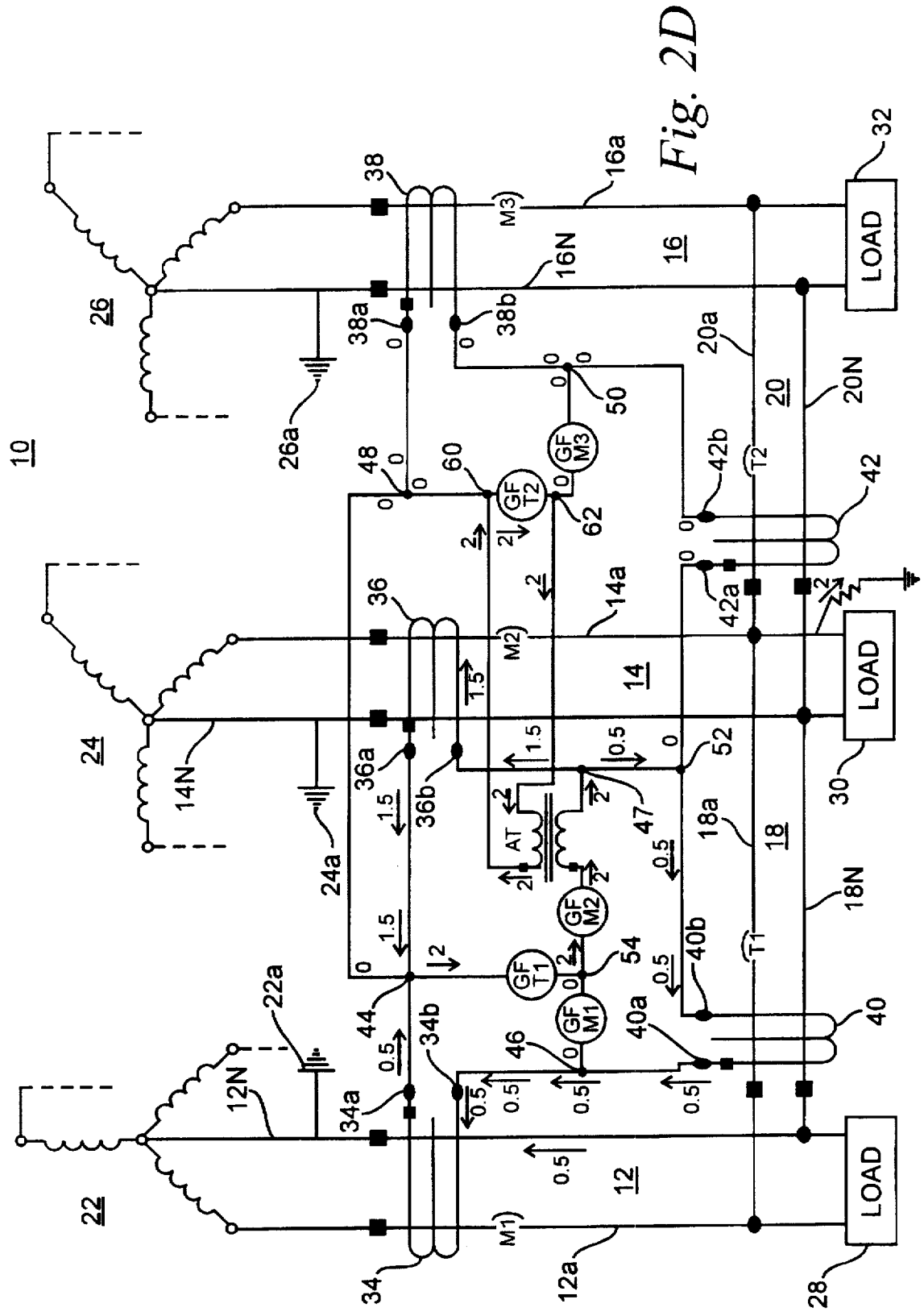

FIG. 2D shows the per unit current representation flowing in the ground fault protection circuit. From FIG. 2C, we see that 0.5 unit of current enters the node 46 from the terminal 40a and that 0.5 unit of current leaves the node 46 towards the terminal 34b. Because the current entering and leaving the node 46 is balanced, there can not be any current flowing through the ground fault relay GFM1 into the node 46, as shown in FIG. 2D. Therefore, the ground fault relay GFM1 does not cause the main circuit breaker M1 to trip. Additionally, the current entering the node 54 from the ground fault relay GFM1 is zero.

Looking at the node 52 in FIG. 2C, we see that 0.5 unit of current must leave and enter the terminal 40b and that no current enters the node from the terminal 42a. Therefore, 0.5 unit of current must enter the node 52 from the node 47 as shown in FIG. 2D. Because 1.5 units of current flow into the terminal 36b of the current sensor 36, as shown in FIG. 2C, then 2 units of current must flow from the node 54, through the ground fault relay GFM2, through the primary or bottom coil of the auxiliary transformer AT and into the node 47. This 2 units of current is then divided into 1.5 units leaving the node 47 toward the terminal 36b of the current sensor 36 and 0.5 unit leaving the node toward the node 52 as shown in FIG. 2D.

As shown in FIG. 2D, because there are 2 units of current flowing through the bottom coil of the auxiliary transformer AT, then 2 units of current must flow through of the secondary of top coil of the auxiliary transformer AT and into the node 60. Because 2 units of current must enter the top coil of the auxiliary transformer AT to match the 2 units of current leaving the top coil, then 2 units of current must flow from the node 60, through the ground fault relay GFT2, into the node 62 and out of the node 62 towards the top coil of the auxiliary transformer AT. The 2 units of current flowing through the ground fault relay GFT2 causes the tie circuit breaker T2 to trip. Because the current leaving the node 60 towards the node 62 matches the current entering the node 60 from the auxiliary transformer AT, then the current entering the node 60 from the node 48 must equal zero. FIG. 2D shows the current entering the node 48 from the terminal 38a of the current sensor 38 is zero; therefore, according to Kirchoff's first law, the current entering the node 48 from the node 44 must also be zero.

FIG. 2D shows that 0.5 unit of current enters the node 44 from the terminal 34a and 1.5 units of current enter the node from the terminal 36a. Because there is no current between the node 44 and the node 48, the 1.5 units of current combines with the 0.5 unit of current to create 2 units of current flowing from the node 44 and through the ground fault relay GFT1 to the node 54 thereby causing the tie circuit breaker T1 to trip.

Because the current entering the node 50 from the terminal 38b and the terminal 42b is zero, then the current leaving the node 50 is also zero. Therefore, the current flowing through the ground fault relay GFM3 is zero and the main circuit breaker M3 is not caused to trip.

The ground fault protection has now been fully analyzed to assure that all laws of circuit analysis have been satisfied. The resulting current path in the ground fault protection circuit establishes a current flowing through the ground fault relays GFT1, GFM2 and GFT2. This current flowing through these ground fault relays causes their respective circuit breakers T1, M2 and T2, respectively, to trip thereby isolating the main bus 14 from the other buses of the system 10. It should be noted that no current flows through the ground fault relays GFM1 and GFM3 thereby ensuring that main circuit breakers M1 and M3 do not trip, thereby allowing the main bus 12 and the main bus 16 to deliver power.

In other types of ground fault protection circuits, the main circuit breakers M1 and M3 may have received trip signals, however, restrained from tripping by selective coordination or restraint signals sent from other circuit breakers. The advantage of the ground fault protection circuit of the present invention is that it is self selecting by the architecture of the ground fault protection circuit and use of the auxiliary current transformer AT. In other words, by using the ground fault protection circuit of the present invention there is no need for selective coordination or restraint signals from other circuit breakers in the system. Additionally, the present invention provides the advantage of not requiring the use of auxiliary control contacts and will function properly independent of the status of the circuit breaker contacts.

It is also important to note that the current entering the node 62 from the ground fault relay GFM3 remains at zero under any assumption so long as the ground fault GF is located on the main bus 14. This is important when considering the function and activity of the auxiliary current transformer AT in relation to the operation of the ground fault relay GFT2. There is a natural tendency to consider that the current from the auxiliary current transformer AT may also flow to the ground fault relay GFM3 and/or other places in the light hand portion of the ground fault protection circuit. By the same token, if current is being directed to the ground fault relay GFT2 by means of the ground fault relay GFM3, there is a tendency to be concerned about the current that might be transferred through the auxiliary transformer AT through the ground fault relay GFM2. However, a degree of isolation is provided by the auxiliary transformer AT to make connections from two different parts of ground fault protection circuit possible.

The foregoing description is not limited to the specific embodiment herein described, but rather by the scope of the claims which are appended hereto. For example, although the preferred embodiment has been described with reference to an electrical power distribution system having three sources and three loads, the design may be easily adapted to an electrical power distribution system having more than three sources and three loads. In these systems, more than one auxiliary transformer will be required for distributing trip current to the proper circuit breaker tripping function.

What is claimed is:

1. A ground fault protection circuit for an electrical power distribution system having i) a plurality of polyphase power sources, each including a plurality of phase conductors and a neutral conductor, ii) a polyphase main bus connected to each one of the power sources and including a plurality of phase conductors and a neutral conductor, iii) a main circuit breaker electrically connected in each of the main buses for interrupting power flowing therethrough, iv) a polyphase tie bus connected between each of the main buses and including a plurality of phase conductors and a neutral conductor, iv) a tie circuit breaker electrically connected in each of the tie buses for interrupting power flowing therethrough, the ground fault protection circuit comprising:

a current sensor associated with each one of the main and tie buses having a pair of output terminals and located adjacent to each one of the main and tie buses for generating a trip current through the output terminals that varies directly with the vector sum of currents flowing through the phase conductors and the neutral conductor at the location of the current sensor;

a trip function associated with each one of the main and tie circuit breakers, wherein current flowing through the trip function causes its associated circuit breaker to trip; and an auxiliary transformer for sending the trip current to a portion of the ground fault protection circuit so that the appropriate tripping faction receives the trip current and causes its associated circuit breaker to trip when a ground fault occurs in the power distribution system.

2. The ground fault protection circuit according to claim 1, wherein the current sensors, the trip functions and the auxiliary transformer being so arranged that in response to the ground fault in the power distribution system, the ground fault protection circuit routes the tripping current through the tripping functions that are operable to produce tripping of the main and tie circuit breakers that are required to be tripped in order to isolate the ground fault.

3. The ground fault protection circuit according to claim 2, wherein current only flows through a secondary winding of the auxiliary transformer when one of the tie circuit breakers is required to trip in response to the ground fault.

4. The ground fault protection circuit according to claim 1, wherein one of the trip functions associated with one of the tie circuit breakers is connected in parallel to a secondary winding of the auxiliary transformer.

5. The ground fault protection circuit according to claim 4, wherein the trip current only flows through the secondary of the auxiliary transformer when the one of the tie circuit breakers is required to trip in response to the ground fault.

6. A ground fault protection circuit magnetically coupled to an electrical power distribution system having i) a plurality of polyphase power sources, each including a plurality of phase conductors and a neutral conductor, ii) a plurality of polyphase main buses, each including a plurality of phase conductors and a neutral conductor, iii) a plurality of main circuit breakers, wherein each one of the plurality of power sources and main buses having one of the plurality of main circuit breakers electrically connected between the phase conductors thereof for interrupting power flowing therethrough, iv) a plurality of polyphase tie buses, each having a plurality of phase conductors and a neutral conductor, wherein each one of the plurality of tie buses connecting one of the plurality of main buses to another one of the plurality of main buses, v) a plurality of tie circuit breakers, wherein each one of the plurality of tie buses having one of the plurality of tie circuit breakers connected therein for interrupting power flowing therethrough, the ground fault protection circuit comprising:

a plurality of current sensors, each having a pair of output terminals, for magnetically coupling the ground fault protection circuit to the plurality of main and tie buses, each one of the plurality of main and tie buses having one of the plurality of current sensors located adjacent thereto for generating a trip current through the output terminals that varies directly with the vector sum of currents flowing through the phase conductors and the neutral conductor at the location of the current sensor;

a plurality of trip functions, each associated with one of the plurality of main and tie circuit breakers, wherein current flowing through a particular one of the plurality of trip functions causes its associated circuit breaker to trip; and an auxiliary transformer having a primary coil and a secondary coil for dividing the ground fault protection circuit into a first portion and a second portion, wherein the auxiliary transformer isolating the first portion from the second portion;

wherein the plurality of current sensors, the plurality of trip functions and the auxiliary transformer being so arranged that in response to a ground fault in the power distribution system, the trip current is routed through the tripping functions that are operable to produce tripping of each of the plurality of circuit breakers that are required to be tripped to isolate the ground fault;

wherein one of the plurality of trip functions is connected in parallel to the secondary winding and is associated with one of the plurality of tie circuit breakers, wherein the trip current only flows through the secondary winding when the one of the plurality of tie circuit breakers is required to trip in order to isolate the ground fault.

7. The ground fault protection circuit according to claim 6, wherein the trip current does not flow through the primary winding when the one of the plurality of tie circuit breakers is not required to trip in order to isolate the ground fault.

8. An electrical power distribution system for transmitting current from a first power source, a second power source and a third power source to a plurality of loads, the electrical power distribution system comprising:

an electrical power distribution circuit comprising:
- a first main bus and a first main circuit breaker electrically connected between the first power source and the first main bus;
- a second main bus and a second main circuit breaker electrically connected between the second power source and the second main bus;
- a third main bus and a third main circuit breaker electrically connected between the third power source and the third main bus;
- a first tie bus connected between the first main bus and the second main bus;
- a second tie bus connected between the second main bus and the third main bus;
- a first tie circuit breaker electrically connected in the first tie bus for interrupting current flowing in the first tie bus;
- a second tie circuit breaker electrically connected in the second tie bus for interrupting current flowing in the second tie bus; and a ground fault protection circuit magnetically coupled to the electrical power distribution circuit having a trip current flowing therethuough only in response to a ground fault condition in the electrical power distribution circuit, the ground fault protection circuit comprising:
- a first current sensor having first and second output terminals and located adjacent the first main circuit breaker for generating the trip current through the output terminals that varies directly with the vector sum of the currents flowing through the first main bus;
- a second current sensor having first and second output terminals and located adjacent the second main circuit breaker for generating the trip current through the output terminals that varies directly with the vector sum of the currents flowing through the second main bus;
- a third current sensor having first and second output terminals and located adjacent the third main circuit breaker for generating the trip current through the output terminals that varies directly with the vector sum of the currents flowing through the third main bus;
- a fourth current sensor having first and second output terminals and located adjacent the first tie circuit breaker for generating the trip current through the output terminals that varies directly with the vector sum of the currents flowing through the first tie bus;
- a fifth current sensor having first and second output terminals and located adjacent the second tie circuit breaker for generating the trip current through the output terminals that varies directly with the vector sum of the currents flowing through the second tie bus;
- a first trip function associated with the first main circuit breaker wherein current flowing through the first trip function causes the first main circuit breaker to trip;
- a second trip function associated with the second main circuit breaker wherein current flowing through the second trip function causes the second main circuit breaker to trip;
- a third trip function associated with the third main circuit breaker wherein current flowing through the third trip function causes the third main circuit breaker to trip;
- a fourth trip function associated with the first tie circuit breaker wherein current flowing through the fourth trip function causes the first tie circuit breaker to trip;
- a fifth trip function associated with the second tie circuit breaker wherein current flowing through the fifth trip function causes the second tie circuit breaker to trip; and
- an auxiliary transformer, having a primary coil and a secondary coil, wherein the fifth trip function is connected in parallel to the secondary coil;

wherein i) the first output terminal of the first current sensor is coupled to one side of the fourth trip function, the first output terminal of the second current sensor, the first output terminal of the third current sensor, one side of the fifth trip function and one side of the secondary coil of the auxiliary transformer; ii) the second output terminal of the first current sensor is coupled to the first output terminal of the fourth current sensor and one side of the first trip function; iii) the second output terminal of the fourth current sensor is coupled to the first output terminal of the fifth current sensor, the second output terminal of second current sensor and one side of the primary coil of the auxiliary transformer; iv) the other side of the primary coil of the auxiliary transformer is coupled to one side of the second trip function; v) the other side of the second trip function is coupled to the other side of the first trip function and the other side of the fourth trip function; vi) the second output terminal of the fifth current sensor is coupled to one side of the third trip function and the second output terminal of the third current sensor and vii) the other side of the third trip function is coupled to the other side of the fifth trip function and to the other side of the secondary coil of the auxiliary transformer.

9. The electrical power distribution system according to claim 8, wherein the auxiliary transformer isolating a first portion of the ground fault protection circuit from a second portion of the ground fault protection circuit and transporting the trip current from the first portion of the ground fault protection circuit to the second portion so that the appropriate trip function receives the trip current and causes its associated circuit breaker to trip when a ground fault occurs in the electrical power distribution circuit.

10. The electrical power distribution system according to claim 8, wherein the trip current flowing through the secondary coil of the auxiliary transformer only when the second tie circuit breaker is required to trip in response to the ground fault condition.

11. The electrical power distribution system according to claim 8, wherein the trip current flowing through the second trip function, the fourth trip function and the fifth trip function in response to the ground fault condition occurring on the second main bus.

* * * * *